Aug. 17, 1937.                I. COWLES                2,090,251
                            HOSE COUPLING
                        Filed March 18, 1937          3 Sheets-Sheet 2
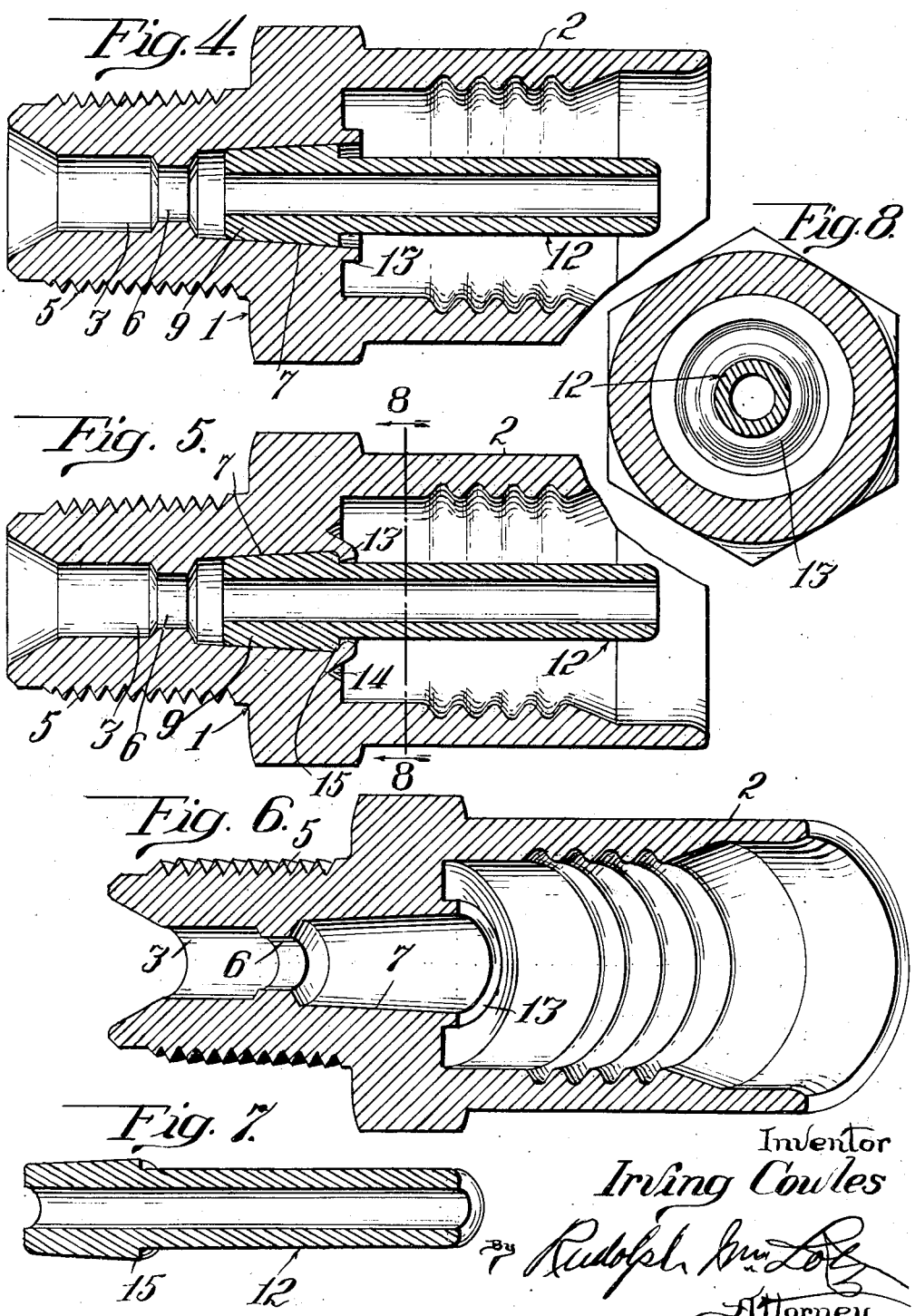
Inventor
Irving Cowles
Attorney Aug. 17, 1937.                I. COWLES                2,090,251
                            HOSE COUPLING
                       Filed March 18, 1937           3 Sheets-Sheet 3
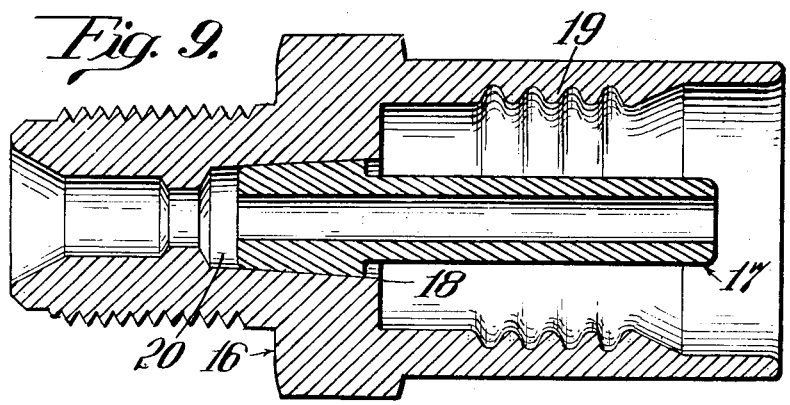
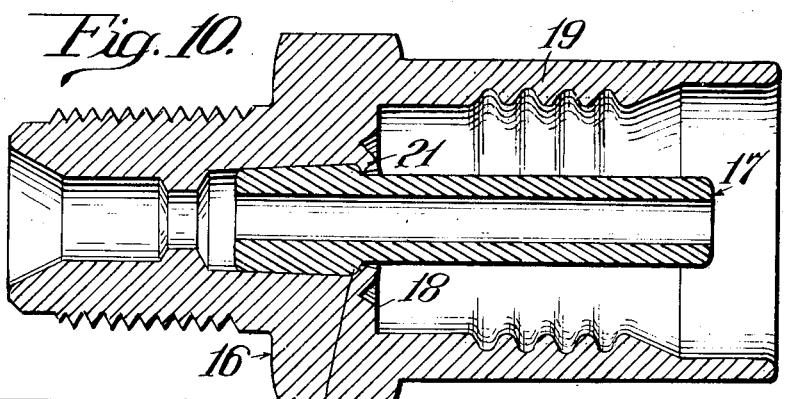
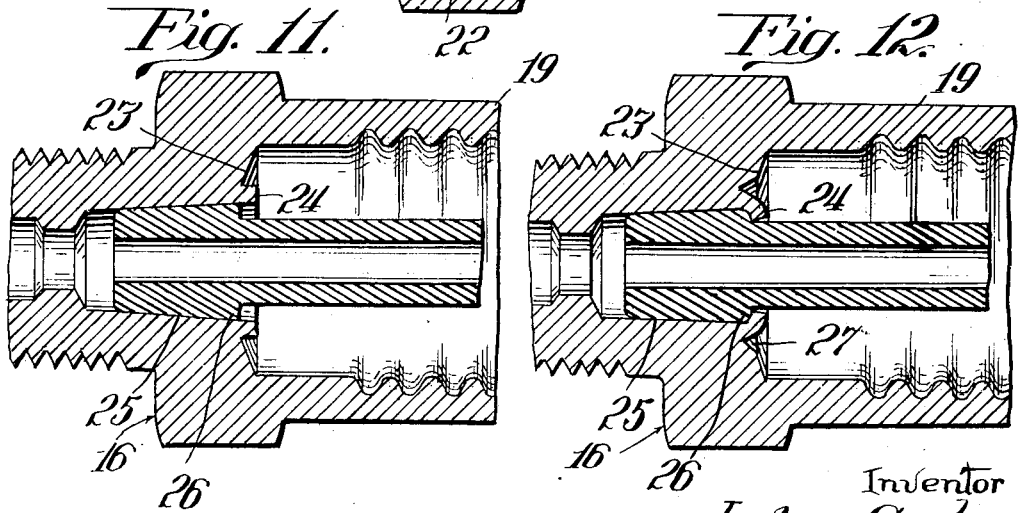
Inventor
Irving Cowles Patented Aug. 17, 1937

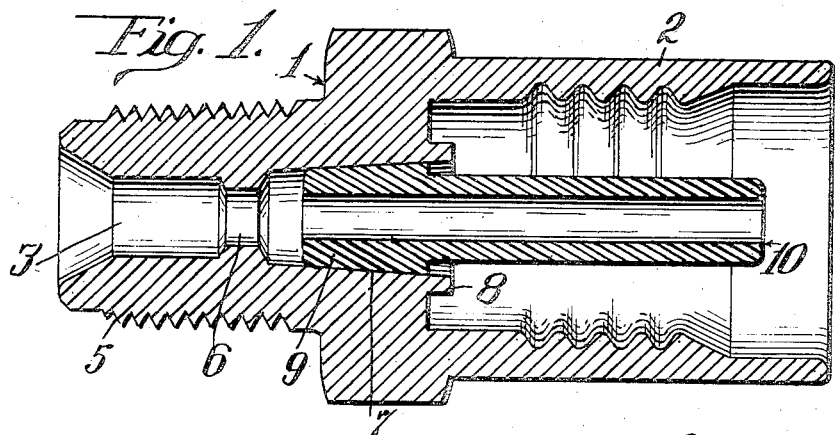
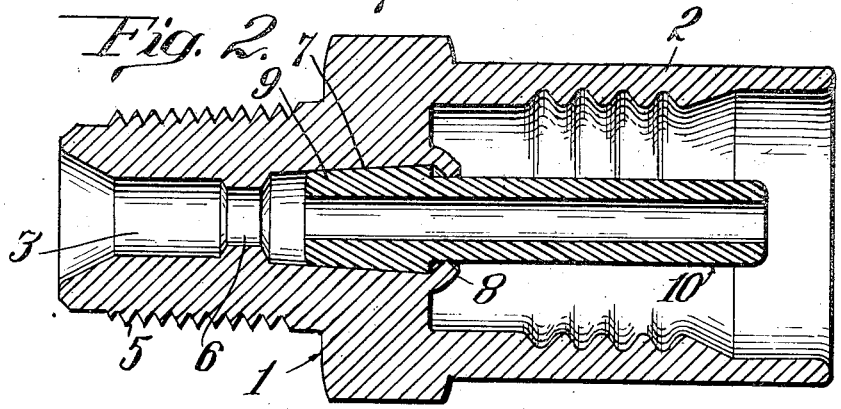
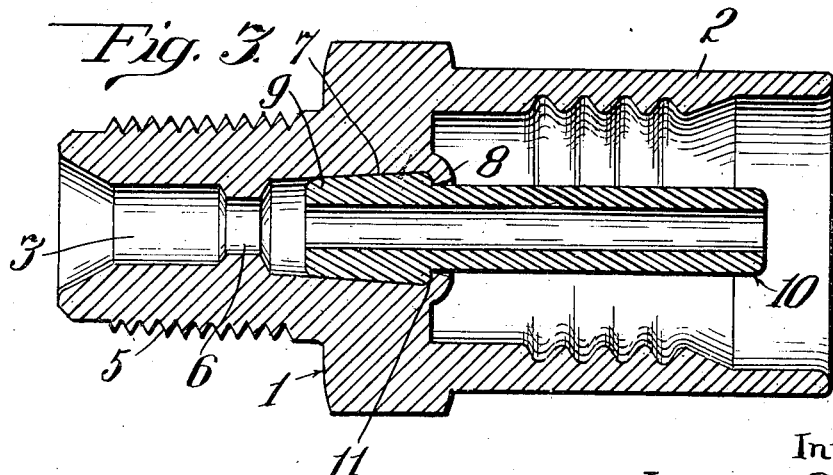

2,090,251

UNITED STATES PATENT OFFICE 2,090,251

HOSE COUPLING

Irving Cowles, Detroit, Mich., assignor to Rudolph W. Lotz, Chicago, Ill., and himself as cotrustees of Utility Patents Trust Application March 18, 1937, Serial No. 131,559

4 Claims. (Cl. 285—84)

This invention relates to a specific improvement in hose couplings, and has for its object to provide a coupling body and stem therefor constituting a separate element which is so assembled with the body of the coupling as to provide a permanent rigid fluid-tight joint between said elements and renders the same inseparable after they have been assembled as hereinafter described.

The invention is capable of being variously embodied and in the accompanying drawings there are illustrated several different embodiments thereof.

In said drawings,

Fig. 1 is a central, longitudinal, sectional view of a conventional type of hose coupling, showing the first step of assembly of the said body portion with the stem of the coupling.

Fig. 2 is a view similar to Fig. 1 showing the coupling body and stem in their permanently assembled relation.

Fig. 3 is a view similar to Fig. 2 showing a slight modification in the construction of the completed assembly.

Fig. 4 is a view similar to Fig. 1 partly broken away, showing another structural modification.

Fig. 5 is a view similar to Fig. 2 showing the parts of Fig. 4 in their final assembled relation.

Fig. 6 is a sectional perspective view of the structure shown in Fig. 4.

Fig. 7 is a perspective sectional view of the stem of the coupling.

Fig. 8 is a transverse sectional view of the completed assembly taken on the line 8—8 of Fig. 5.

Fig. 9 is a view similar to Fig. 1 showing another modification in construction.

Fig. 10 is a view similar to Fig. 2 showing the parts of Fig. 1 in permanent assembled relation.

Fig. 11 is a view similar to Fig. 1 showing another form of embodiment of the invention.

Fig. 12 is a view similar to Fig. 10 showing the stem and coupling body in permanent assembled relation.

In the art of hose couplings for the type of flexible hose made to withstand extremely high pressures, such as twenty thousand or more pounds per square inch, the tendency of the hose to be blown out of the coupling to which it is attached imposes a great tension stress on the stem, tending to withdraw it from the coupling. The component parts of couplings for said high-pressure hose are required to be made of steel, and economic manufacture of said coupling requires that the stem of the coupling be made separately from the coupling body and the shell integral therewith, and that same be assembled with said coupling body in rigid fluid-tight relation thereto and against all possibility of withdrawal of the stem from the coupling under the tension stress aforesaid, or due to tension stress caused by subjecting the hose itself to tension otherwise than by the action of fluid pressure within the same.

Such a separate association of the stem with the coupling body as is desired to meet the conditions aforesaid has proven to be a matter of appreciable difficulty and the present invention has been devised to overcome such difficulties and provide a connection for assembly between the coupling body and the stem which will meet all requirements and which, at the same time, is extremely simple.

In carrying out the invention, the body 1 of the coupling which, in the instances illustrated, is shown as equipped with a hose-receiving shell 2 integral with said body portion, is provided with a central bore or passage 3 which is formed to provide a female portion desirable in some instances and which extends through the externally threaded end portion or nipple 5 of the coupling. Extending from the shell into the coupling body co-axially with the bore 3 and spaced from the latter by a contracted bore portion 6, is a slightly tapered opening or bore portion 7 bordered, in the instances of Figs. 1-3 inclusive, by an annular flange 8. The length of said tapered bore portion 7, including the flange 8, is appreciably greater than the similarly tapered end portion 9 of the stem 10 which is disposed concentrically of the shell 2 and is driven into said bore portion 7 as the first step in the assembly of the structure, thus assuring a fluid-tight joint between said stem 10 and coupling body 1.

Following this step in the assembly of the structure, the flange 8 is turned over and contracted by means of a suitable die to the shape and position shown in Fig. 2 so that the base portion of said flange engages the larger extremity of the tapered end portion of the stem 10 and thus holds the latter permanently against withdrawal from its socket or against its becoming loose therein.

It will be observed that in the structure of Fig. 2, the flange 8 is spaced, in part, from the annular shoulder at the larger end of the tapered portion of the stem 10, whereas, in Fig. 3 the said annular shoulder 11 is rounded and the flange 8 of the coupling body is turned over to completely hug the said rounded shoulder 11 of the stem, this being preferable in some instances.

As shown in the structure of Figs. 4-7 inclusive, the stem 12 is identical in shape with the stem 10 of Figs. 1 and 2 and the coupling body corresponds in every detail with that shown in Figs. 1, 2 and 3. In effecting the turning over of the flange 13 of the coupling body of Figs. 4-6 inclusive, a die is used which has a sharp V-shaped annular edge which forms an annular recess 14 around the flange 13 during the operation of turning said flange over to the position shown in Fig. 5 and in effect serving as a means for elongating said flange and causing it to closely hug the annular shoulder 15 at the larger end of the tapered end portion of the stem 12.

In the structure of Fig. 9, the coupling body 16 is devoid of the annular flange 8 or 15, and, in the final step of effecting assembly between the stem 17 and said coupling body 16, a die having an annular substantially V-shaped edge is used which is driven into the annular shoulder 18 at the inner end of the shell 19 to form a V-shaped annular groove therein which is spaced from the mouth of the tapered bore portion 20 and thus, by displacement of metal, forms the equivalent of the flange 8 or 15, as the case may be, in the inturned lip 21 shown in Fig. 10, which overhangs and engages the annular shoulder 22 at the larger end of the tapered end portion of the stem 17.

The structure of Figs. 11 and 12 is similar to that of Figs. 9 and 10, except that the annular shoulder 18 as shown in Figs. 9 and 10 is cut away to provide a tapered shoulder 23 bordering the annular flange 24 which borders the larger mouth of the tapered bore portion 25 of Fig. 11.

In effecting the final assembly of the parts shown in Fig. 11, the same type of die is used as in the case of the structure of Fig. 5 which serves to turn in the said flange 24 to engage the annular shoulder 26 of the stem at the same time that it forms the V-shaped recess 27 between the outer face of the flange 24 and the remaining portion of the tapered shoulder 23.

The advantage of the structure of Figs. 11 and 12 over that of the respective sets of views above described, lies in the fact that after the final assembly of the coupling with a hose end portion inserted into the same, resort is had to a progressive contraction of the shell of the coupling from its mouth to its inner end portion. This progressive contraction effects a very appreciable displacement of hose wall material toward the annular shoulder at the inner end of the shell and, by providing the tapered shoulder 23, more space is provided for the reception of the displaced material which prevents disadvantageous counter displacement of hose wall material which may result from lack of said space.

By means of the pressure exerted upon the annular shoulder at the larger end of the tapered end portion of the stem in all of the structures shown and described, the stem is rendered non-rotatable relatively to the body portion of the coupling under the influence of any torsional stress exerted upon the stem during assembly of the hose end with the coupling.

I claim as my invention:

1. In a hose coupling, a body member equipped with an axial bore having a flaring end portion, a hollow stem for said body portion equipped with an annularly enlarged inner end portion of less length than said flared end portion of the bore of the body member and shaped to fit snugly within the latter, said enlarged end portion of said stem terminating in an annular shoulder disposed substantially at the mouth of said flared bore portion, and an annular inturned flange bordering the mouth of said flared bore portion and engaged with said annular shoulder of said stem for cooperation with said flared bore portion and said enlarged portion of said stem for holding said stem rigid with said body member.

2. In a hose coupling, a body member equipped with an axial bore terminating at one end in a slightly tapered portion of appreciable length, a hollow stem equipped at one end with a similarly tapered annular enlargement of less length than said tapered portion and driven into the latter for firm and non-rotatable and fluid-tight engagement with said body portion under the application of torsional stress on said stem effected by forcing the latter into a hose end by rotation of said stem in effecting such insertion, said stem equipped with an annular shoulder constituting the terminal of said tapered enlargement and disposed substantially at the mouth of said tapered bore portion, and an annular inturned flange bordering said mouth of said tapered bore portion and engaged with said annular shoulder and exerting pressure upon the latter in the direction of the axis of said bore for permanently connecting said stem with said body member and maintaining the same non-rotatable relatively to each other.

3. In a hose coupling, a body member equipped with an axial bore terminating at one end in a slightly tapered portion of appreciable length, a hollow stem equipped at one end with a similarly tapered annular enlargement of less length than said tapered portion and driven into the latter for firm and nonrotatable and fluid-tight engagement with said body portion under the application of torsional stress on said stem effected by forcing the latter into a hose end by rotation of said stem in effecting such insertion, said stem equipped with an annular shoulder constituting the terminal of said tapered enlargement and disposed substantially at the mouth of said tapered bore portion, an annular inturned flange bordering said mouth of said tapered bore portion and engaged with said annular shoulder and exerting pressure upon the latter in the direction of the axis of said bore for permanently connecting said stem with said body member and maintaining the same non-rotatable relatively to each other and an annular shoulder between said flange and the coupling shell opposed to the mouth of the latter and spaced rearwardly in part at least from the outer edge of said flange.

4. In a hose coupling, a body member equipped with an axial bore having a flaring end portion, a hollow stem for said body portion equipped with an annularly enlarged inner end portion of less length than said flared end portion of the bore of the body member and shaped to fit snugly within the latter, said enlarged end portion of said stem terminating in an annular shoulder disposed substantially at the mouth of said flared bore portion, an annular inturned flange bordering said mouth of said tapered bore portion and engaged with said annular shoulder and exerting pressure upon the latter in the direction of the axis of said bore for permanently connecting said stem with said body member and maintaining the same non-rotatable relatively to each other and an annular shoulder lying between said flange and the coupling shell and opposed to the mouth of the latter, said shoulder spaced along its smaller diameter portion from the outer extremity of said flange.

IRVING COWLES.